United States Patent
Dixit et al.

(10) Patent No.: US 8,262,955 B2
(45) Date of Patent: Sep. 11, 2012

(54) EPOXY FOAM RESIN

(75) Inventors: Amit Dixit, Bhopal (IN); Pradip Kumar Dubey, Dist. Goraadhpur (IN); Tatiya Laksanangam, Roi-Et (TH)

(73) Assignee: Aditya Birla Chemical (Thailand) Ltd., Bangkok (TH)

( * ) Notice: Subject to any disclaimer, the term of this patent is extended or adjusted under 35 U.S.C. 154(b) by 7 days.

(21) Appl. No.: 12/810,243

(22) PCT Filed: Oct. 21, 2008

(86) PCT No.: PCT/IN2008/000694
§ 371 (c)(1), (2), (4) Date: Sep. 15, 2010

(87) PCT Pub. No.: WO2009/087653
PCT Pub. Date: Jul. 16, 2009

(65) Prior Publication Data
US 2011/0042843 A1    Feb. 24, 2011

(30) Foreign Application Priority Data
Dec. 27, 2007 (IN) .......... 2587/MUM/2007

(51) Int. Cl.
*B29C 45/76* (2006.01)

(52) U.S. Cl. .................................. 264/40.1

(58) Field of Classification Search ............. 264/40.1
See application file for complete search history.

(56) References Cited

U.S. PATENT DOCUMENTS
6,110,982 A * 8/2000 Russick et al. ............... 521/54

FOREIGN PATENT DOCUMENTS
| | | |
|---|---|---|
| GB | 912967 A | 12/1963 |
| GB | 1114904 A | 5/1968 |
| GB | 1143644 A | 2/1969 |

* cited by examiner

Primary Examiner — Larry Thrower
(74) Attorney, Agent, or Firm — Robert P. Michal; Lucas & Mercanti, LLP

(57) ABSTRACT

A process for making epoxy resin foam blocks of varying density comprising mixing together (i) a foam resin comprising: a first epoxy resin, a foaming agent to the extent of 2% to 10% of the mass of the epoxy resin, a surfactant to the extent of 2% to 6% of the mass of the epoxy resin, a filler, a toughening agent and (ii) a curing agent comprising: a hardener and a second epoxy resin, the ratio of the foam resin to curing agent being in the range of about 100:20 to 100:25 by mass to form a reaction mixture; pouring the reaction mixture inside a mold maintained at a temperature in the range of 70° to 80° C. and allowing the mixture to cure in the mold for 60 to 100 min.; allowing the mold to cool at a temperature in the range of 15° C. to 30° C. and demolding to obtain a green block; and post-curing the green block in an air circulatory oven for 10 to 15 hrs to obtain a final hard foam block.

14 Claims, 1 Drawing Sheet

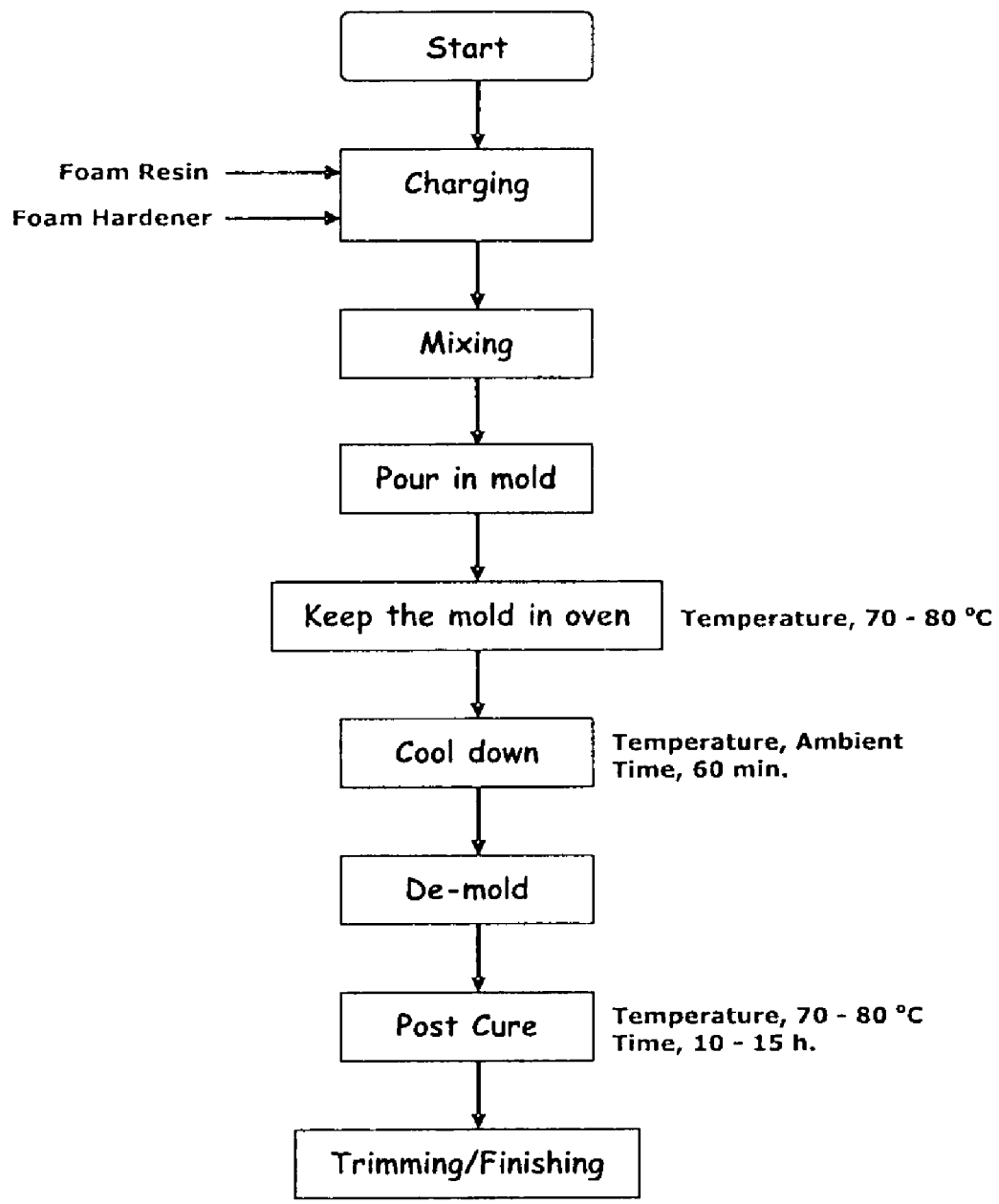

EPOXY FOAM RESIN

CROSS-REFERENCE TO RELATED APPLICATIONS

This application is a 371 of PCT/IN2008/000694 filed on Oct. 21, 2008, which claims the benefit of Indian Patent Application No. 2587/MUM/2007 filed on Dec. 27, 2007, the contents of each of which are incorporated herein by reference.

FIELD OF INVENTION

This invention relates to a process for manufacturing Epoxy foam.

BACKGROUND OF THE INVENTION

Historically, epoxy resins are known for excellent electrical insulation and adhesion properties. Bisphenol-A based epoxy resins are the most common among various types of epoxy resins available commercially. Curing of epoxy resin is achieved by reacting it with polyamines, polyamides, carboxylic anhydrides, poly-phenols, and amine complexes. The epoxy or the 'oxirane' ring opens up and reacts with the hardener without forming any byproduct at ambient or elevated temperatures depending upon the nature and use of hardeners.

Recently, epoxy foams have been investigated because they exhibit excellent combination of mechanical properties like tensile strength, adhesion strength, compression strength, electrical properties like dissipation factor, dielectric constant, volume resistivity and adhesion properties including low shrinkage, low density, low water absorption and low flammability.

In order to make epoxy foams, suitable foaming agents are required. The foaming agents may be chemicals such as carbonates, bicarbonates, hydrazides and the like which decompose during exothermic reactions and liberate gases. The chemical agents may also react with resins/hardeners and release the gases necessary for the foaming action. Foaming agents can also be physical agents such as toluene, fluorocarbons and the like which simply vaporize during exothermic reactions and the liberated vapors help in forming foam structures. Chemical surfactants also play important roles in mixing or dispersing of foaming agents, foam cell sizes and structures. Surfactants may be silicon based or polyol based materials. Micronized inert fillers of particle size in nanometers are also very important to control cell size, cell structure, and foam density by nucleating effects. Higher concentration of fillers also helps in reducing cost and exothermic temperatures.

Processing of epoxy foams is a challenging task and needs synchronization of several parameters such as rheology of the mix, curing rate, and rate of reaction of foaming agents. An appropriate rise in the viscosity during reactions allows formation of uniform cell structures. Too low and/or fast rise in the viscosity restrict the development of foam structures and that may collapse completely. Too fast and/or too slow reactions between resins and curing agents also spoil the network and cause the foams to be irregular, in appropriate in density, and with disturbed cell structures.

The density of the foam is dependent on several factors such as the selection of resins, hardeners, types and amount of foaming agents, fillers, and processing parameters like temperature, mass of the mix, and mold shapes and sizes. Epoxy foams with density up to 170 kgs/$m^3$ are reported with silicon type blowing agents.

DEFINITIONS

In the context of this invention the term "Green block" means a block which is uncured or partially cured or the block that is not fully set or matured.

"Hardener or curing agent" means a substance or mixture of substance added to a material to increase or control the curing reaction by taking part in it.

Existing Knowledge

U.S. Pat. No. 6,110,982 discloses epoxy foam and a process for the preparation of the same. This epoxy foam comprises a resin, a curing agent, at least one blowing agent, at least one surfactant and optionally at least one filler. The epoxy foam is prepared by mixing a plurality of resins with a plurality of curing agents, a surfactant and blowing agent, whereby a foam able mixture is formed at a temperature greater than the boiling temperature of the blowing agent where this mixture is foamed and cured.

U.S. Pat. No. 4,546,118 discloses an epoxy foam product which is produced by frothing in an intensive mixer. An epoxy functional reactant stream and a curing agent stream in the presence of a surfactant and gaseous frothing agent. The blowing agent used is an inert gas which is difficult to handle and also increases the number of process steps.

U.S. Pat. No. 6,271,463 discloses a high voltage liquid-filled transformer including housing and a dielectric liquid impregnated barrier material within the housing. The barrier material is prepared from an expandable epoxy resin formulation comprising: (i) at least one polyglycidyl compound; (ii) at least one curing agent for the polyglycidyl compound; and (iii) at least one blowing agent.

OBJECTS OF THE INVENTION

One of the objects of the present invention is to provide a process for preparation of epoxy foam of varying densities.

Another object of the present invention is to provide a process for preparation of epoxy foam which is economical.

Yet another object of the present invention is to provide a process for preparation of epoxy foam which has good mechanical properties.

Yet another object of the present invention is to provide a process for preparation of epoxy foam which has good electrical properties.

Yet another object of the present invention is to provide a process for preparation of epoxy foam which has good adhesion properties like low shrinkage and low water absorption.

It is also an object of the present invention to provide a process for preparation of epoxy foam whereby the reactants are easily hand able and the parameters are easily controllable.

SUMMARY OF THE INVENTION

In accordance with the invention there is provided a process for making epoxy resin foam blocks of varying density comprising the following steps:

mixing together (i) a foam resin comprising: a first epoxy resin, a foaming agent to the extent of 2% to 10% of the mass of the epoxy resin, a surfactant to the extent of 2% to 6% of the mass of the epoxy resin, a filler, a toughening agent and (ii) a curing agent comprising: a hardener and a second epoxy resin, the ratio of the foam resin to curing agent being in the range of about 100:20 to 100:25 by mass to form a reaction mixture;

pouring the reaction mixture inside a mold maintained at a temperature in the range of 70° to 80° C. and allowing the mixture to cure in the mold for 60 to 100 min.;

allowing the mold to cool at a temperature in the range of 15° C. to 30° C. and demolding to obtain a green block; and post-curing the green block in an air circulatory oven for 10 to 15 hrs to obtain a final hard foam block.

Typically, the foam resin is made by the following steps:

mixing the first epoxy resin and foaming agent in a reaction chamber and stirring at a speed of about 500 rpm to form a homogeneous mixture;

heating while stirring the homogeneous mixture to a temperature in the range of about 70-80° C.;

increasing the speed of stirring to about 600-1000 rpm and temperature to about 120° C.-180° C. to obtain a mixture containing froth;

cooling the mixture containing the froth to a temperature in the range of about 15 to 30° C. and skimming off the froth to obtain a reaction resin;

mixing said reaction resin with the surfactant, filler and toughening agent to obtain a mixture; and stirring the mixture at a speed of about 50-200 rpm to form a homogeneous foam resin.

Typically, the curing agent is made by the following steps:

mixing together predetermined quantities of a hardener and the second epoxy resin at a speed of about 50-500 rpm and temperature in the range of 70-80° C. to form a reaction mixture; and cooling the reaction mixture to a temperature in the range of about 15 to 30° C. to obtain a curing agent.

Typically, the first epoxy resin is at least one selected from a group consisting of diglycidyl ether of Bisphenol-A, diglycidyl ether of Bisphenol-F, cycloaliphatic epoxy resins, epoxidized aliphatic, cycloaliphatic and aromatic—monofunctional, difunctional, trifunctional reactive diluents, multifunctional epoxy resins, modified epoxy resins, either alone or in combinations thereof.

Preferably, the first epoxy resin is diglycidyl ether of Bisphenol-A having viscosity in the range of 8000 to 27000 cP.

Typically, the second epoxy resin is at least one selected from a group consisting of diglycidyl ether of Bisphenol-A, diglycidyl ether of Bisphenol-F, cycloaliphatic epoxy resins, epoxidized aliphatic, cycloaliphatic and aromatic—monofunctional, difunctional, trifunctional reactive diluents, multifunctional epoxy resins, modified epoxy resins, either alone or in combinations thereof.

Typically, the foaming agent is at least one selected from a group consisting of methyl hydrogen polysiloxanes, carbonates, bicarbonates, hydrazides, low boiling solvents, either alone or in combination thereof.

Typically, the ionic or non-ionic surfactant is at least one selected from a group consisting of copolymer of polypropylene glycol and polyethylene glycol, cetyl alcohol, oleyl alcohol, Sodium dodecyl sulfate, Sodium laureth sulfate, Cetyl trimethylammonium bromide and Cetylpyridinium chloride.

Preferably, the surfactant is copolymer of polypropylene glycol and polyethylene glycol.

Typically, the filler is at least one selected from a group consisting of hydrophilic fumed silica, hydrophobic fumed silica, clay, talc, titanium oxide and zinc oxide.

Preferably, the filler is hydrophilic fumed silica.

Preferably, the filler is present in the range of 0.5% to 2.5% by the mass of the first epoxy resin.

Typically, the toughening agent is at least one selected from a group consisting of acrylate monomers, oligomers, polyurethane acrylates, epoxidized acrylates and blends thereof.

Preferably, the toughening agent is present in the range of about 2% to 10% by the mass of the first epoxy resin.

Typically, the hardener is at least one selected from group consisting of aliphatic, aromatic, cycloaliphatic polyamines, polyamides either alone or in combinations thereof.

Preferably, the hardener is present in the range of about 1% to 5% by the mass of the first epoxy resin.

In accordance with one preferred embodiment of the invention a epoxy resin foam blocks of varying densities ranges in about 60 kg/m$^3$ (0.06 gm/cc) to 800 kg/m$^3$ (0.8 gm/cc) are obtained.

BRIEF DESCRIPTION OF THE ACCOMPANYING DRAWING

FIG. 1 shows a process flow diagram for a preferred embodiment of the present invention for preparation of a foam block.

DETAILED DESCRIPTION OF THE INVENTION

The process for making epoxy resin foam blocks of varying density comprises the following steps:

A foam resin is first made as follows

The first epoxy resin is mixed with foaming agent in a reaction chamber and stirred at a speed of about 500-600 rpm to form a homogeneous mixture. The first epoxy resin can be at least one selected from a group consisting of diglycidyl ether of Bisphenol-A, diglycidyl ether of Bisphenol-F, cycloaliphatic epoxy resins, epoxidized aliphatic, cycloaliphatic and aromatic—monofunctional, difunctional, trifunctional reactive diluents, multifunctional epoxy resins, modified epoxy resins, either alone or in combinations thereof. Preferably, the first epoxy resin is liquid diglycidyl ether of Bisphenol-A having viscosity in the range of 9000-25000 cP.

The foaming agent can be at least one selected from a group consisting of methyl hydrogen polysiloxanes, carbonates, bicarbonates, hydrazides, low boiling solvents, either alone or in combination thereof. Preferably, the foaming agent is methyl hydrogen polysiloxane is present in the range of about 2% to 10% of the mass of the first epoxy resin.

The mixing is continued till the solution becomes milky. This milky solution is stirred continuously and heated to a temperature of about 70-80° C. The stirring speed is further increased to about 600-1000 rpm and temperature to about 120-180° C. to obtain a mixture containing froth. The mixture containing froth is then cooled to a temperature in the range of about 15 to 30° C. and the froth and bubbles are skimmed off to obtain a reaction resin. The reaction resin so obtained is mixed in a reaction vessel along with appropriate quantities of a surfactant, a filler and toughing agent to obtain a mixture. The ionic or non-ionic surfactant can be at least one selected from a group consisting of copolymer of polypropylene glycol and polyethylene glycol, cetyl alcohol, oleyl alcohol, Sodium dodecyl sulfate, Sodium laureth sulfate, Cetyl trimethylammonium bromide and Cetylpyridinium chloride. Preferably, the surfactant is copolymer of polypropylene glycol and polyethylene glycol present in the range of about 2% to 6% of the mass of the first epoxy resin. The filler can be at least one selected from a group consisting of hydrophilic fumed silica, hydrophobic fumed silica, clay, talc, titanium oxide and zinc oxide. Preferably, the filler is hydrophilic fumed silica present in the range of 0.5% to 2.5% by the mass of the first epoxy resin. The toughening agent can be at least one selected from a group consisting of acrylate monomers, oligomers, polyurethane acrylates, epoxidized acrylates and blends thereof. Preferably, the toughening agent is present in the range of about 2% to 10% by the mass of the first epoxy resin. These reactants are mixed at a speed of about 50-200 rpm to form a homogeneous foam resin.

The curing agent is made according to the following steps:
Predetermined quantities of a hardener and the second epoxy resin having viscosity in the range of about 9000 cP to 25000 cP are charged into a reaction vessel. These two reactants are mixed thoroughly at a speed of about 50-500 rpm and heated to a temperature of about 70-80° C. for about 1-2 hrs. to form a reaction mixture. The second epoxy resin can be at least one selected from a group consisting of diglycidyl ether of Bisphenol-A, diglycidyl ether of Bisphenol-F, cycloaliphatic epoxy resins, epoxidized aliphatic, cycloaliphatic and aromatic—monofunctional, difunctional, trifunctional reactive diluents, multifunctional epoxy resins, modified epoxy resins, either alone or in combinations thereof. The hardener can be at least one selected from group consisting of aliphatic, aromatic, cycloaliphatic polyamines, polyamides either alone or in combinations thereof. Preferably, the hardener is trimethyl hexamethylene diamine present in the range of about 1% to 5% by the mass of the first epoxy resin. This reaction mixture is then cooled to a temperature in the range of 15 to 30° C. to obtain the curing agent.

The foam resin and curing agent thus obtained from the above mentioned process steps are mixed thoroughly in the ratio of 100:20 to 100:25 by mass to obtain a reaction mixture. The resultant reaction mixture is then poured inside a mold maintained at a temperature in the range of 70 to 80° C. and the mixture is allowed to cure in the mold for 60 to 100 min. The mold is allowed to cool to temperature in the range of 15 to 30° C. for about 60 min and then demolded to obtain a green block. The green block is then kept in an air circulatory oven for about 10 to 15 hours for post curing at temperatures between 70-80° C. to obtain a hard foam block. Finishing/trimming operation gives a final foam block of density in the range of about 60-800 kgs/m$^3$. FIG. 1 shows a process flow diagram for making a foam block from foam resin and curing agent.

The invention will now be described with respect to the following examples, which do not limit the invention in any way and only exemplify the invention.

Example 1

Step 1

Bisphenol-A epoxy resin of viscosity 10000 cP weighing 1900 gm and 100 gm of foaming agent (methyl hydrogen polysiloxane) were mixed in a reaction vessel and agitated at 500 rpm for 5 minutes till homogenous milky white solution was obtained. The homogenous milky white solution so obtained was heated up to 80° C. and continuously stirred at 500 rpm. After sometime the agitation speed was raised to 690 rpm to achieve reaction temperature of 140° C. This was continued for 3 hours till froth was formed. The reaction mixture so obtained was cooled to temperature around 23° C., the froth and bubbles were skimmed off to obtain reaction resin.

Step 2

1 kg of foam reaction resin obtained in step 1 was charged in another reaction vessel with 40 gm surfactant (polyol), 10 gm of filler (aerosil 200) and 50 gm of toughening agent (DM 564). These charged reactants were mixed in a reaction vessel and agitated at 100 rpm for about 12 minutes to form a homogenous mixture of foam resins.

100 gm of above foam resin and 5 gm of foaming agent (methyl hydrogen polysiloxane) were charged in reaction vessel and mixed properly till a milky solution was obtained.

Step 3

Foam hardener or the curing agent was prepared separately and then added to the foam resin to obtain a foam block.

2000 gm of trimethyl hexamethylene diamine (TMD) and 200 gm of Bisphenol-A epoxy resin of viscosity 10000 cP were charged into reaction vessel and continuously mixed at speed of 300 rpm and heated to about 80° C. for about 2 hour.

The mixture so obtained was again charged in another reaction vessel with 500 gm of bisphenol-A and stirred continuously for 30 minutes at 80° C.

The mixture so obtained was cooled at 23° C. temperature to obtain hardener. The hardener thus obtained was added to the foam resin obtained in step 2 to get a foam block.

Step 4

Foam blocks were prepared by mixing the foam resin and the hardener and pouring the resultant mixture in a hot foam mold of selected size and shape. Foam mold of desired shape was prepared by putting silicon grease inside the mold and then it was kept in the oven at 50° C. for about 40 minutes. Foam mold was now ready to make a foam block.

Foam resin and hardener were charged in the reaction vessel in the proportion of 100:20-25 by weight and were mixed at speed of 500-1500 rpm for about 4 minutes. The resultant mixture so obtained was poured into a hot mold at a temperature of 50° C. The mold was then kept in oven for about 90 minutes and temperature was maintained at 50° C. The mold so obtained after 90 minutes was then cooled down to temperature in the range of 15 to 30° C. and then demolded to obtain a green block. The green block was then kept in air-circulatory oven for 15 hrs. for post curing to obtain final hard foam block of density 0.10-0.12 gm/cc.

The density of a hard uniform foam block was determined according to ISO 845. The foam block was sanded to remove silicon grease on the surface and cut in to a size of 100×100× 25.4 mm. The weight and volume of the foam sample were measured to calculate the density.

Mechanical and electrical tests were performed for the foam blocks of different densities and results were tabulated as in table 1.

Example 2

The same procedure was carried out as described in example 1 except that; 2100 gms of Bisphenol-A epoxy resin having viscosity of 11000 cP and 90 gm of foaming agent were used in step (1) while 40 gms of surfactant was used in step (2) and 2200 gms of trimethyl hexamethylene diamine (TMD) and 180 gm bisphenol-A epoxy resin and 400 gms of Bisphenol-A were used in step (3).

This gives foam blocks of density 0.12-0.14 gm/cc.

Example 3

The same procedure was carried out as described in example 1 except that; 2000 gms of Bisphenol-A epoxy resin having viscosity of 13000 cP and 80 gm of foaming agent were used in step (1) while 50 gms of surfactant was used in step (2) and 1900 gms of trimethyl hexamethylene diamine (TMD) and 190 gm bisphenol-A epoxy resin and 500 gms of Bisphenol-A were used in step (3). This gives foam blocks as made by the procedure of example 3a density of 0.12-0.14 gm/cc.

Example 4

The same procedure was carried out as described in example 1 except that; 1700 gms of Bisphenol-A epoxy resin having viscosity of 14500 cP and 75 gm of foaming agent were used in step (1) while 35 gms of surfactant was used in step (2) and 2100 gms of trimethyl hexamethylene diamine (TMD) and 210 gm bisphenol-A epoxy resin and 600 gms of Bisphenol-A were used in step (3). This gives foam blocks as made by the procedure of example 4a density of 0.10-0.12 gm/cc.

Example 5

The same procedure was carried out as described in example 1 except that; 2200 gms of Bisphenol-A epoxy resin having viscosity of 21000 cP and 90 gm of foaming agent were used in step (1) while 55 gms of surfactant was used in step (2) and 2150 gms of trimethyl hexamethylene diamine (TMD) and 230 gm bisphenol-A epoxy resin and 700 gms of Bisphenol-A were used in step (3). This gives foam blocks as made by the procedure of example 5a density of 0.14-0.16 gm/cc.

Example 6

The same procedure was carried out as described in example 1 except that; 1850 gms of Bisphenol-A epoxy resin having viscosity of 25000 cP and 90 gm of foaming agent were used in step (1) while 48 gms of surfactant was used in step (2) and 2400 gms of trimethyl hexamethylene diamine (TMD) and 265 gm bisphenol-A epoxy resin and 800 gms of Bisphenol-A were used in step (3).

This gives foam blocks as made by the procedure of example 6a density of 0.14-0.16 gm/cc.

Foam density is determined according to ISO 845. The foam block was sanded to remove silicon grease on the surface and cut in to a size of 100×100×25.4 mm. The weight and volume of the foam sample were measured to calculate the density.

Compression test is performed in accordance with ISO 844. Specimen foam was cut to 30 mm square by 25.4 mm thick. The specimens were compressed between two stainless steel plates, and the load was applied with a crosshead speed of 2.5 mm/min.

Further, specimens were tested as per ASTM and ISO test standards for mechanical, electrical and thermal properties. The properties thus achieved are illustrated in table 1.

TABLE 1

Performance Properties

| Property | Unit | Test Method | Foam 1 Example 1 and 2 | | Foam 2 Example 3 and 4 | | Foam 3 Example 5 and 6 | |
| --- | --- | --- | --- | --- | --- | --- | --- | --- |
| Mechanical | | | | | | | | |
| Nominal Density | gm/cc | ISO 845 | 0.11 | 0.13 | 0.13 | 0.11 | 0.15 | 0.15 |
| Compression Strength | MPa | ASTM D1621 | 0.90 | 0.95 | 0.95 | 0.90 | 1.40 | 1.40 |
| Compression modulus | MPa | | 45 | 52 | 52 | 45 | 74 | 74 |
| Tensile strength | MPa | ASTM D1623 | 1.10 | 1.30 | 1.30 | 1.10 | 1.80 | 1.80 |
| Tensile Modulus | MPa | | 60 | 67 | 67 | 60 | 80 | 80 |
| Adhesion strength Steel-Steel, 0.5 mm | MPa | ASTM D1002 | 2.30 | 2.80 | 2.80 | 2.30 | 3.50 | 3.50 |
| Glass Transition Temp.(Tg) | ° C. | DSC | 95 | 96 | 96 | 95 | 97 | 97 |
| Electrical | | | | | | | | |
| Dielectric constant (1 MHz) | — | IEC 60250 | 1.1 | 1.2 | 1.2 | 1.1 | 1.3 | 1.3 |
| Dissipation factor (1 MHz) | — | IEC 60250 | 0.003 | 0.003 | 0.003 | 0.003 | 0.004 | 0.004 |
| Volume Resistivity (500 V) | Ohm-cm | IEC 60093 | $10^{15}$ | $10^{15}$ | $10^{15}$ | $10^{15}$ | $10^{15}$ | $10^{15}$ |
| Surface Resistance (500 V) | Ohm | IEC 60093 | $10^{13}$ | $10^{13}$ | $10^{13}$ | $10^{13}$ | $10^{13}$ | $10^{13}$ |
| Dielectric Strength | KV/mm | IEC 60243 | 3.0 | 3.3 | 3.3 | 3.0 | 3.6 | 3.6 |

List of Abbreviations Used

| Sr. No. | Abbreviation | Full Name |
| --- | --- | --- |
| 1 | DM 564 | Doublemer 564 (Aliphatic urethane acrylate oligomer blend with HDDA) |
| 2 | TMD | Trimethyl hexamethylene diamine |
| 3 | HDDA | 1,6 hexanediol diacrylate. |
| 4 | ASTM | American Society for Testing and Materials |
| 5 | ISO | International organization for standardization |
| 6 | IEC | International electro technical commission |
| 7 | DSC | Differential scanning calorimeter |

While considerable emphasis has been placed herein on the specific structure of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation Economic Significance of Invention Conventionally PVC, PU and SAN foams are used as core materials for lightweight structural applications. The epoxy foams of this invention are intended as an alternative to these foams. Epoxy foams are expected to provide superior secondary bonding on account of matrix compatibility and uniform cell structure. The epoxy foam can be used in-situ or can be used as preformed blocks and are hence user friendly as compared to the PVC, PU and SAN foams other than these advantages, the epoxy foam are cost economical in terms of processing and cost per cubic meter of a block.

Technical Advancement:

In accordance with this invention the product formed from the reaction mixtures act as in-situ surfactant and helps in the dispersion of additional foaming agent which help to maintain uniform cell sizes in the foam structures. Furthermore, the modification of epoxy resins with polyurethane—HDDA solution increases the crosslink density and also improves mechanical strength of low density foam considerably. In the prior art the epoxy foams up to 170 kgs/m3 are reported with silicon type blowing agents whereas, in the present invention it is demonstrated that it is possible to prepare epoxy foams up to 70 kgs/m3 density with uniform cell size and high mechanical strength.

The invention claimed is:

1. A process for making epoxy resin foam blocks of varying density comprising the following steps:
   (i) preparing a foam resin comprising: a first epoxy resin, a foaming agent to the extent of 2% to 10% of the mass of the epoxy resin, a surfactant to the extent of 2% to 6% of the mass of the epoxy resin, a filler, and a toughening agent, wherein the foam resin is made by the following steps:
   mixing the first epoxy resin and the foaming agent in a reaction chamber and stirring at a speed of about 500 rpm to form a homogeneous mixture;
   heating while stirring the homogeneous mixture to a temperature in the range of about 70° C. to 80° C.;
   increasing the speed of stirring to about 600-1000 rpm and temperature to about 120° C. to 180° C. to obtain a mixture containing froth;
   cooling the mixture containing the froth to a temperature in the range of about 15° C. to 30° C. and skimming off the froth to obtain a reaction resin;
   mixing said reaction resin with the surfactant, the filler and the toughening agent to obtain a mixture containing the reaction resin, the surfactant, the filler and the toughening agent; and
   stirring the mixture containing the reaction resin, the surfactant, the filler and the toughening agent at a speed of about 50-200 rpm to form a homogeneous foam resin; and
   (ii) preparing a curing agent comprising: a hardener and a second epoxy resin, and
   mixing together the foam resin and the curing agent, the ratio of the foam resin to curing agent being in the range of about 100:20 to 100:25 by mass to form a reaction mixture;
   pouring the reaction mixture inside a mold maintained at a temperature in the range of 70° C. to 80° C. and allowing the mixture to cure in the mold for 60 to 100 min.;
   allowing the mold to cool at a temperature in the range of 15° C. to 30° C. and demolding to obtain a green block; and
   post-curing the green block in an air circulatory oven for 10 to 15 hrs to obtain a final hard foam block.

2. A process as claimed in claim 1, wherein the curing agent is made by the following steps:
   mixing together predetermined quantities of a hardener and the second epoxy resin at a speed of about 50-500 rpm and temperature in the range of 70-80.degree. C. to form a reaction mixture; and
   cooling the reaction mixture to a temperature in the range of about 15 to 30.degree. C. to obtain a curing agent.

3. A process as claimed in claim 1, wherein the first epoxy resin is selected from the group consisting of diglycidyl ether of Bisphenol-A, diglycidyl ether of Bisphenol-F, cycloaliphatic epoxy resins, epoxidized aliphatic, cycloaliphatic and aromatic—monofunctional, difunctional, trifunctional reactive diluents, multifunctional epoxy resins, modified epoxy resins, and combinations thereof.

4. A process as claimed in claim 1, wherein the first epoxy resin is diglycidyl ether of Bisphenol-A having viscosity in the range of 8000 to 27000 cp.

5. A process as claimed in claim 1, wherein the second epoxy resin is selected from the group consisting of diglycidyl ether of Bisphenol-A, diglycidyl ether of Bisphenol-F, cycloaliphatic epoxy resins, epoxidized aliphatic, cycloaliphatic and aromatic—monofunctional, difunctional, trifunctional reactive diluents, multifunctional epoxy resins, modified epoxy resins, and combinations thereof.

6. A process as claimed in claim 1, wherein the foaming agent is methyl hydrogen polysiloxane.

7. A process as claimed in claim 1, wherein the surfactant is copolymer of polypropylene glycol and polyethylene glycol.

8. A process as claimed in claim 1, wherein the filler is hydrophilic fumed silica.

9. A process as claimed in claim 1, wherein the filler is present in the range of 0.5% to 2.5% by the mass of the first epoxy resin.

10. A process as claimed in claim 1, wherein the toughening agent is selected from the group consisting of acrylate monomers, oligomers, polyurethane acrylates, epoxidized acrylates and blends thereof.

11. A process as claimed in claim 1, wherein the toughening agent is present in the range of about 2% to 10% by the mass of the first epoxy resin.

12. A process as claimed in claim 1, wherein the hardener is selected from the group consisting of aliphatic, aromatic, cycloaliphatic polyamines, polyamides, and combinations thereof.

13. A process as claimed in claim 1, wherein the hardener is present in the range of about 1% to 5% by the mass of the first epoxy resin.

14. A process as claimed in claim 1, wherein the density ranges from about 60 kg/m.sup.3 (0.06 gm/cc) to 800 kg/m.sup.3 (0.8 gm/cc).

* * * * *